United States Patent [19]

Baumgartner et al.

[11] Patent Number: 4,840,550
[45] Date of Patent: Jun. 20, 1989

[54] INTERNAL AXIS ROTARY PISTON ENGINE WITH PROTRUSIONS HAVING TWO SEALING CORNERS

[75] Inventors: Hans Baumgartner, Viersen; Manfred Brandstädter, Düsseldorf; Ulrich Henke, Übach Palenberg, all of Fed. Rep. of Germany

[73] Assignee: Pierburg GmbH, Fed. Rep. of Germany

[21] Appl. No.: 145,836

[22] Filed: Jan. 20, 1988

[30] Foreign Application Priority Data

Jan. 29, 1987 [DE] Fed. Rep. of Germany ....... 3702558

[51] Int. Cl.4 .......................... F01C 1/10; F01C 19/00
[52] U.S. Cl. .................................. 418/150; 418/168; 418/178
[58] Field of Search ............... 418/150, 166, 167, 168, 418/171, 178, 169, 170

[56] References Cited

U.S. PATENT DOCUMENTS

| | | | |
|---|---|---|---|
| 748,348 | 12/1903 | Cooley | 418/168 |
| 1,682,563 | 8/1928 | Hill | 418/171 |
| 1,863,335 | 6/1932 | Hill | 418/171 |
| 1,990,750 | 2/1935 | Pigott | 418/168 |
| 3,126,833 | 3/1964 | Hill | 418/167 |
| 3,865,522 | 2/1975 | Nardi | |
| 4,673,342 | 6/1987 | Saegusa | 418/166 |

FOREIGN PATENT DOCUMENTS

| | | |
|---|---|---|
| 0073271 | 10/1983 | European Pat. Off. . |
| 2456252 | 6/1976 | Fed. Rep. of Germany . |
| 3432915 | 12/1985 | Fed. Rep. of Germany . |
| 59-145302 | 8/1984 | Japan .................... 418/166 |
| 961872 | 6/1964 | United Kingdom ............ 418/168 |
| 1580241 | 11/1980 | United Kingdom . |
| 1594942 | 8/1981 | United Kingdom . |

Primary Examiner—John J. Vrablik
Attorney, Agent, or Firm—Toren, McGeady & Associates

[57] ABSTRACT

In a rotary piston engine which can be produced by simple manufacturing techniques and which has an outer and an inner rotor which rotate in a housing about different axes of rotation, wherein strip-like projections on inwardly extending engagement members generate the contour of the piston of the inner rotor, whereby a well-defined contact seal can be realized in use, the projections have two sealing corners adjacent to but spaced from one another in the direction of rotation of the outer rotor.

7 Claims, 2 Drawing Sheets

INTERNAL AXIS ROTARY PISTON ENGINE WITH PROTRUSIONS HAVING TWO SEALING CORNERS

TECHNICAL FIELD OF THE INVENTION

The invention relates to a rotary piston engine having an inner and an outer rotor which rotate in a housing around different axes of rotation, and having strip-like projections on inwardly extending engagement members of the outer rotor which generate the contour of the pistons of the inner rotor.

BACKGROUND OF THE INVENTION AND PRIOR ART

Axial rotary piston engines with internal axes and two rotors or runners rotating in the same direction, in which inner and outer rotors with profiled flanks formed according to the rules of gear tooth system similarly to an outer and inner gear tooth system mesh with one another, are divided into three types according to the criteria introduced in this field by Wankel's publication "Classification of rotary piston engines" (1963, Deutsche Verlag-Anstalt GmbH, Fachverlag Stuttgart). According to this, in a socalled "KA-engine" the curve generation points lie on the outer rotor and in a so-called "KI-engine" they lie on the inner rotor, whilst in an engine with a third kind of engagement the curve generation comes about through surfaces that sometimes touch and make rolling contact in the manner of a gear tooth system.

The choice of the appropriate type of engine, i.e. the profiling or curve generation of the interengaging tooth flanks, depends essentially on the performance and the volume throughput of the rotary piston engine; harmful flow constrictions and dead spaces, i.e. the volume not displaced by the pistons of the inner rotor penetrating into the working areas, should be avoided or reduced as much as possible. These requirements often contradict one another, e.g. in order to obtain greater rigidity of the rotary piston engine it is often not possible to avoid cutting away the ends of the outer rotor parts that taper towards the periphery even though at the same time this results in larger dead spaces having to be accepted.

A rotary piston engine is known from the German Offenlegungsschrift No. 24 56 252 in which the inner rotor has bulbs acting as pistons which are adapted to the shape of recesses in the outer rotor that form working areas and whose generating curve is shaped as a trochoid. The bulbous pistons of the inner rotor are kinematically generated by sealing strips arranged in grooves in crests between the recesses of the outer rotor; i.e. it is a so-called "KA-engine" and the contour of the inner rotor is determined by the radially-inward projecting sealing strips, as a function of the movement of the two rotors relative to one another and relative to the engine housing. As a result of the working areas being sealed by means of the sealing strips, a non-contact gap seal is achieved in this known rotary piston engine, i.e. except at the sealing strips there is no contact between the profiled flanks of the inner and outer rotors. This has the particular advantage that in the manufacture of the two rotors no exact manufacturing tolerances have to be kept to; against this however there is the disadvantages, arising from the trochoidal generating curve of the bulbous curves of the inner rotor, generated by the sealing strips, of larger harmful dead spaces in the working areas. Especially when semicircular sealing strips engage at their radial ends in the root between two pistons, the unavoidable dead space is still further increased. When the engine is used as a compressor this can lead to already compressed gas being returned to the intake side of the engine.

From the German Offenlegungsschrift No. 34 32 915 an internal axis rotary piston engine is known which represents a combination of the types of engagement of the three known engines; namely in each operational phase there is a direct connection between the contour of the inner and outer rotor such that in every rotational phase the rotors exert an effect which determines (i.e. generates) the contour of the other rotor and that at the same time gear tooth-like engagement of the inner and outer rotors is simultaneously realised. So that both rotors mutually generate or determine their form by their relative movement, corner regions of the inner rotor move along the inner side surfaces of the outer rotor and inner corner regions of the outer rotor move along the outer peripheral surfaces of the inner rotor. Through this mutual influence the volume not displaced by the pistons of the inner rotor that penetrate into the working areas is reduced, i.e. the harmful dead spaces are reduced down to a negligible size by the optimization of the rotor contours. In this way a compromise is reached in which on the one hand dead spaces are reduced to a negligible size without on the other hand causing unduly high or unwanted restricted flows. Realising this aim, however, requires, when manufacturing this known rotary piston engine, highly expensive manufacturing techniques and high precision of the contours of the profiled flanks of the inner and outer rotors which constantly mesh with one another.

OBJECT OF THE INVENTION

Starting from the concept of a so-called "KA-engine", i.e. an engine with curve-generating points which lie on the outer rotor, the object of the invention is to produce a rotary piston engine of this type which has the advantages of a design that can be produced by simple production techniques and with which, in use, a contact seal can nevertheless be realised without enlarging the dead space.

BRIEF DESCRIPTION OF THE INVENTION

According to the invention this object is achieved by projections which have two sealing corners adjacent to but spaced from one another in the direction of rotation of the outer rotor. The corners are preferably located either on a circle whose centre coincides with the axis of rotation of the outer rotor, or else the preferably radially inwardly projecting strip-like projections have, between the corners, a contour corresponding to part of a hypocycloid. It is easier to manufacture corners located on a circle. However, in both cases it is ensured that only the corners, which may be slightly rounded off, determine, as producers of the envelope generating curve, the contour of the inner rotor, and that when the engine is assembled only the corners constitute the sealing edges to the inner rotor. Since the volume of the working areas is exclusively sealed by the sealing edges formed by the corners and extending along the whole length of the inner rotor, the other section of the outer rotor contour can be manufactured with considerably less precision, i.e. with more clearance and, in distinction for example to hypo- and epicycloid contours, possibly by simple drilling; a tolerance fitting requiring expensive production techniques is therefore no longer necessary. Instead, the essential need for absolute precision of the outer rotor contour is therefore just confined to the corners; if contact should occur between the outer and inner rotors the corners or edges will at most suffer some material wear which is in practice not harmful. When a piston of the inner rotor extends into a working area of the outer rotor, only the corners of two neighbouring engagement parts of the outer rotor touch the piston, so that a dead space is formed which narrows in the shape of a crescent towards the corners; in contrast to this, in the rotary piston engine with contact seals known from the German Offenlegungsschrift No. 24 56 252, the dead space is increased in the region of the sealing strips.

Optimal use of working area, or the limitation of the dead space to what is constructionally unavoidable for KA engines with a contact seal, can be attained with envelope generating curves produced by the corners, or a contour of the piston of the inner rotor determined by the corners, if preferably every corner describes an epicycloid. It is advantageous if the epicycloids described by the corners of each of the strip-like projections intersect at the vertex of the peripheral surface of a piston of the inner rotor. The geometry of a rotary piston engine for obtaining the largest possible sealing radius with simultaneously a small dead space and high volume utilization, is therefore determined firstly in that the vertex points of the inner rotor describe a hypocycloid in the outer rotor; this hypocycloid is interrupted by recesses in the outer rotor which form working areas. The other sections of the hypocycloid—or for reasons of manufacturing technique, sections of arcs of circles—form corners or edges with the walls of the working areas, which on the other side produce peripheral surfaces of the inner rotor. The epicycloids described by the two corners of each individual projection intersect at the vertex of the periphral surfaces of a piston of the inner rotor, i.e., the intersection of the two epicycloids represents the highest point of a piston.

Advantageously at least the corners of the strip-like projections of the outer rotor can be manufactured from a softer material than the material of the inner rotor. In the case of pairs of materials in which the material of at least the corners of the outer rotor is softer than the material of the inner rotor, the corners can even be oversize: in this case the corners are ground down to correspond to the contour of the inner rotor. A suitable pair of materials is for example magnesium for the outer and silicon-containing aluminium for the inner rotor.

The strip-like projections are advantageously provided with a replaceable body that includes the corners; the replaceable body can for example be formed as a wear shoe which can be put or slide on.

BRIEF DESCRIPTION OF THE DRAWINGS

The invention will now be described in more detail with reference to exemplary embodiments shown in the drawings, where.

DETAILED DESCRIPTION OF PREFERRED EMBODIMENTS OF THE INVENTION

Figure 1:
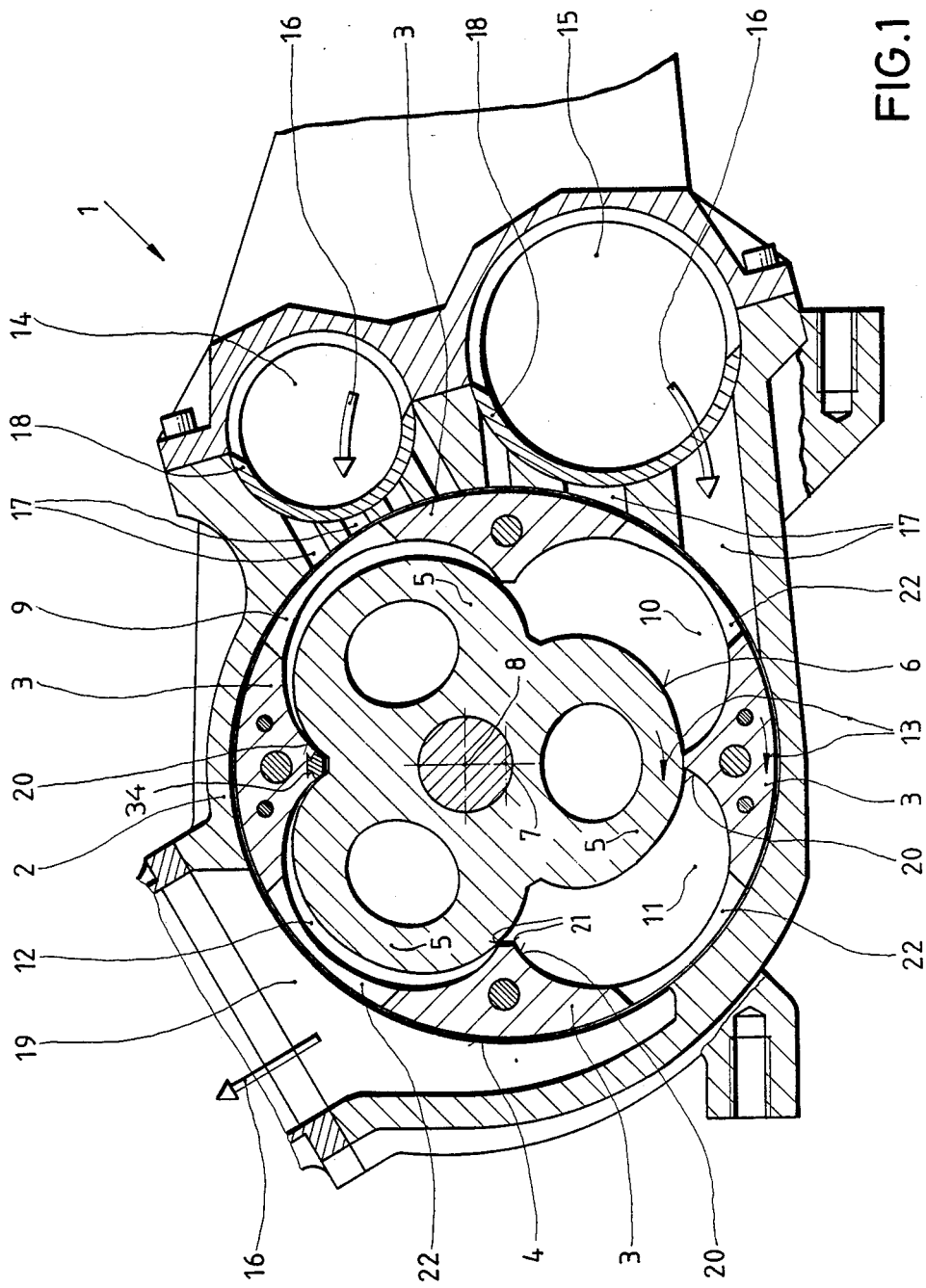
FIG. 1 shows a radial cross-section of a rotary piston engine in which radial projections from engagement members of the outer rotor have defined corners.

In a rotary piston engine 1 a housing 2 encloses an outer rotor 4 comprising four engagement members 3 rigidly connected with one another, and an inner rotor 6 having three rotating pistons 5; the rotors 4, 6 rotate in the same direction, but at different speeds about axes 7, 8 that are spaced apart from one another. The speed ratio is 4 : 3, corresponding to the ratio of the number of working areas 9 to 12 formed between the engagement members 3 of the outer rotor 4 to the number of pistons 5 of the inner rotor 6; in the case of a speed ratio of 3 : 2, for example, the inner rotor 6 has two pistons located opposite one another and has the shape of a "dog bone" profile whilst the outer rotor correspondingly has three engagement members.

As the outer rotor 4 rotates about the axis 7 and the inner rotor 6 about the axis 8 in the direction of the arrow 13 a medium, e.g. air, is sucked in, as is indicated by the arrow 16, via two intake lines 14, 15 via intake ports 17 arranged in the housing 2. In the positions of the inner and outer rotors 4, 6 shown in FIG. 1 the medium 16 is sucked by the piston 5, which rotates eccentrically about the fixed axis of rotation 7 of the outer rotor 4, through the intake lines 14, 15 and the intake ports 17 and into the working areas 9, 10; arranged in the intake lines 14, 15 are rotary slide valves 18 with which the intake ports 17 can be shut off variably. In the course of further rotation of the rotors 4, 6 of the rotary piston engine 1 in the direction of the arrow 13, the medium sucked in arrives in an exhaust area 19 through which the compressed medium is expelled, as shown for the working area 12.

Strip-like projections 20 on the engagement members 3 of the outer rotor 4 project radially inwards, and each has two adjacent corners, recognizable in FIGS. 1 to 3 only as corner points 21 due to the cross-sectional representation, spaced from one another in the direction of rotation 13 of the outer rotor 4; in the following description these corners of the outer rotor 4, which extend as sealing edges along the whole axial length of the inner rotor 6, will be designated as corner points 21. The corner points 21, producing the envelope generating curve, determine the contour of the inner rotor 6, in particular the contour of the pistons 5 of the inner rotor 6 which dip into the working areas 9 to 12 formed by the wall recesses 22 in the outer rotor 4; by this means a well defined contact seal can be realised. As shown in detail in FIG. 2, the corner points 21 lie at a distance 23 from one another, either on a circular arc 24 which runs at a radius R about a centre 25 coinciding with the axis of rotation 7 of the outer rotor 4 or on a hypocycloid 27 in the outer rotor 4 described by the apices 26 of the piston 5 of the inner rotor 6. The corner points 21 enclose between them either an arc 28 of a circle or a part 29 of a hypocycloid (cf. FIG. 3). The distance of the corner points 21 (or sealing edges) from the centre 25 of the axis of rotation 7 is determined by the following criteria: the smallest internal radius of the piston 5—starting from the centre 25 of the axis of rotation 7 of the outer rotor 4—corresponds to the sum of the radius of the shaft associated with the axis of rotation 8 of the inner rotor 6 and twice the eccentricity (distance of the axes of rotation 7, 8 from one another); the smallest possible distance of the corner points 21 corresponds to the sum of the smallest internal radius of the piston 5 and the eccentricty. Maintaining these geometrical relationships excludes the possibility of a connection between the pressure and suction sides of the rotary piston engine 1 from occurring and leading to power loss. With respect to the distance 23 (cf. FIG. 2) of the corner points 21 from one another, account must be taken of the fact that the manufacturing problems increase as the distance becomes smaller: since the path lines of the corner points 21 intersect at the vertex 26 of the piston 5, the distance 23 determines the extent of the path deviation at the point 26, i.e. the transition from a hypocycloid to an arc of a circle with opposite curvature.

Figure 2:
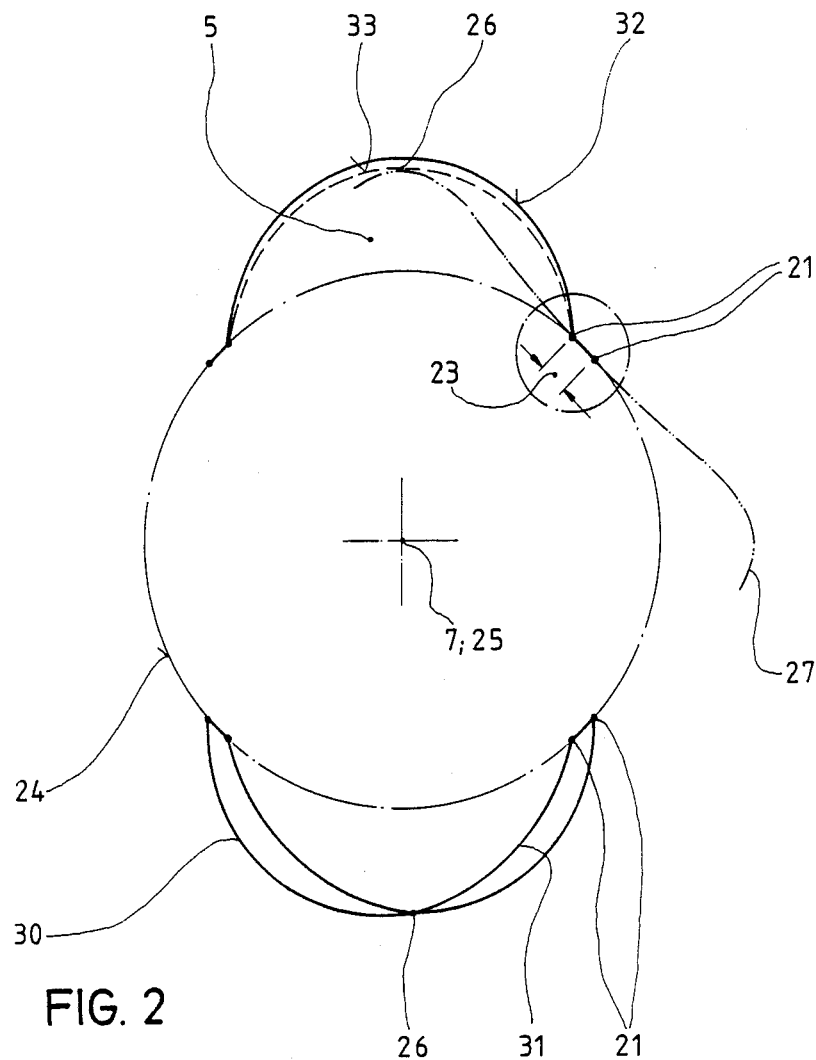
FIG. 2 shows in kinematically simplified form envelope generating curves that are generated by corners of the engagement parts of the outer rotor that include between them a section of a hypocycloid or of an arc of a circle and define the contour of a piston of an inner rotor of a rotary piston engine according to FIG. 1.
Figure 3:
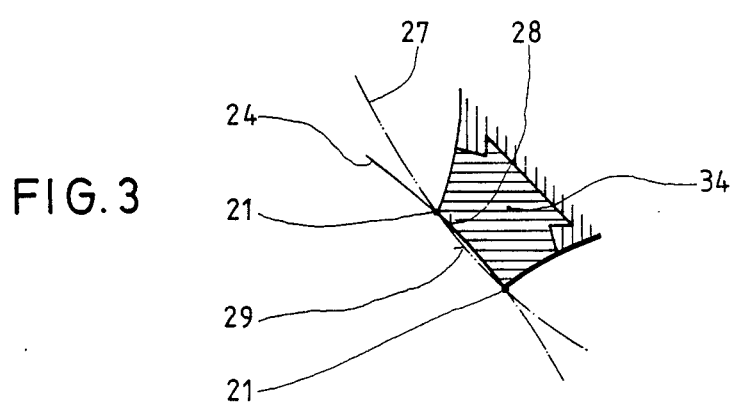
FIG. 3 shows an enlarged representation of a detail denoted in FIG. 2 by a dash-dot circle.

As the rotors 4, 6 rotate, i.e. as they run along the pitch circle of the inner rotor 6, each corner point 21 of the outer rotor 4 describes an epicycloid 30, 31; the epicycloids 30, 31, described by the corner points 21 of each of the strip-like projections 20, intersect at the vertex 26 of the peripheral surface of a piston 5 of the inner rotor 6, as shown in the lower half of FIG. 2. The corner points 21, located adjacent next to one another at a definite distance apart, produce an envelope generating curve 33 in the form of an epicycloid which determines the contour of the piston 5; the contour 32 of the recesses 22 of the wall of the outer rotor 4 which pass over into the working areas 9 to 12 corresponds to the envelope generating curve 33. As shown in FIG. 1 for the uppermost engagement member 3 in drawing, the corner points 21 can be formed on an exchangeable body 34 formed e.g. as a wear shoe; the exchangeable body 34 can for example be seated on or pushed over the strip-like projections 20. The corners 21 can also be manufactured from a softer material than the material of the inner rotor.

What is claimed is:

1. A rotary piston engine, comprising:
   a housing;
   an outer rotor and an inner rotor provided so as to rotate around different axes of rotation, the outer rotor having engagement parts defining working spaces therebetween and the inner rotor having pistons; and
   strip-like protrusions having two sealing corners provided so as to extend in a spaced manner next to each other in the rotational direction of the outer rotor, said protrusions being provided at the engagement parts of the outer rotor so as to project radially inward and form a contour of the pistons of the inner rotor, the working spaces each having a volume exclusively sealed by sealing edges formed by the sealing corners so as to extend across the entire length of the inner rotor, these sealing corners being arranged so that only sealing corners of two adjacent engagements parts of the outer rotor contact a piston of the inner rotor as the piston enters a working space of the outer rotor.

2. A rotary piston engine according to claim 1, wherein the strip-like projections having exchangeable bodies exhibiting the corners.

3. A rotary piston engine according to claim 1, wherein the corners lie on a circle whose center coincides with the axis of rotation of the outer rotor.

4. A rotary piston engine according to claim 1, wherein the strip-like projections have, between the corners, a contour corresponding to a part of a hypocycloid.

5. A rotary piston engine according to claim 1, wherein each corner describes an epicycloid.

6. A rotary piston engine according to claim 5, wherein the epicycloids described by the corners of each strip-like projection intersect at the vertex of the peripheral surface of a piston of the inner rotor.

7. A rotary piston engine according to claim 5, wherein the material of at least the corners of the strip-like projections of the outer rotor is softer than the material of the inner rotor.

* * * * *